(12) United States Patent
Duong et al.

(10) Patent No.: US 10,309,256 B2
(45) Date of Patent: Jun. 4, 2019

(54) NON-LINEAR BUMPER BEARINGS

(71) Applicant: United Technologies Corporation, Hartford, CT (US)

(72) Inventors: Loc Quang Duong, San Diego, CA (US); Xiaolan Hu, San Diego, CA (US)

(73) Assignee: UNITED TECHNOLOGIES CORPOATION, Farmington, CT (US)

( * ) Notice: Subject to any disclaimer, the term of this patent is extended or adjusted under 35 U.S.C. 154(b) by 468 days.

(21) Appl. No.: 15/029,494

(22) PCT Filed: Oct. 10, 2014

(86) PCT No.: PCT/US2014/060070
§ 371 (c)(1),
(2) Date: Apr. 14, 2016

(87) PCT Pub. No.: WO2015/102719
PCT Pub. Date: Jul. 9, 2015

(65) Prior Publication Data
US 2016/0265387 A1 Sep. 15, 2016

Related U.S. Application Data

(60) Provisional application No. 61/891,066, filed on Oct. 15, 2013.

(51) Int. Cl.
*F01D 5/02* (2006.01)
*F01D 25/16* (2006.01)
(Continued)

(52) U.S. Cl.
CPC .......... *F01D 25/164* (2013.01); *F01D 5/021* (2013.01); *F01D 25/16* (2013.01); *F01D 25/24* (2013.01);
(Continued)

(58) Field of Classification Search
CPC .......... B64C 7/02; B64C 11/48; B64D 29/06; B64D 29/08; B64D 2027/005;
(Continued)

(56) References Cited

U.S. PATENT DOCUMENTS 3,398,996 A * 8/1968 Wucherer ............... F16C 17/03
384/103
4,668,108 A * 5/1987 McHugh ................. F16C 27/00
384/215
(Continued)

FOREIGN PATENT DOCUMENTS

GB 2172668 A 9/1986

OTHER PUBLICATIONS

European Search Report for Application No. EP 14 87 59 71.
(Continued)

*Primary Examiner* — Carlos A Rivera
*Assistant Examiner* — Jesse M Prager
(74) *Attorney, Agent, or Firm* — Cantor Colburn LLP

(57) ABSTRACT

A bumper bearing assembly includes a bearing housing having a level of radial spring stiffness, wherein the bearing housing defines a bearing seat. A bumper bearing is connected to the bearing housing by a spring having a level of radial spring stiffness lower than that of the bearing housing. The bumper bearing is configured to apply the level of radial spring stiffness of the spring against a rotor with the bumper bearing spaced apart from the bearing seat. The bearing housing is configured to apply the level of radial spring stiffness of the bearing housing against the rotor with the bumper bearing seated against the bearing seat.

20 Claims, 5 Drawing Sheets

(51) Int. Cl.
*F01D 25/24* (2006.01)
*F16C 17/03* (2006.01)
*F16C 27/02* (2006.01)
*F16C 17/02* (2006.01)
*F16C 17/24* (2006.01)
*F16C 33/10* (2006.01)

(52) U.S. Cl.
CPC .............. *F16C 17/02* (2013.01); *F16C 27/02* (2013.01); *F05D 2220/32* (2013.01); *F05D 2240/52* (2013.01); *F16C 17/03* (2013.01); *F16C 17/24* (2013.01); *F16C 33/108* (2013.01); *F16C 2360/23* (2013.01)

(58) Field of Classification Search
CPC ...... F01D 25/24; F05D 2220/32; Y02T 50/66; F16C 17/02; F16C 33/208; F16C 27/063; F16C 25/04
See application file for complete search history.

(56) References Cited

U.S. PATENT DOCUMENTS

| | | | |
|---|---|---|---|
| 4,927,275 A * | 5/1990 | Lawson | F16C 17/03 384/117 |
| 5,205,652 A * | 4/1993 | Chapman | F01D 25/164 384/106 |
| 5,531,522 A | 7/1996 | Ide | |
| 5,738,445 A * | 4/1998 | Gardner | F01D 25/164 384/119 |
| 5,743,654 A | 4/1998 | Ide et al. | |
| 6,505,837 B1 | 1/2003 | Heshmat | |
| 2003/0118257 A1 | 6/2003 | Lee et al. | |
| 2008/0095482 A1 | 4/2008 | Swann et al. | |
| 2009/0304313 A1 | 12/2009 | Ertas | |
| 2011/0064340 A1* | 3/2011 | Duong | F16C 27/045 384/99 |
| 2011/0085752 A1 | 4/2011 | Tecza et al. | |
| 2011/0194933 A1 | 8/2011 | Klusman | |

OTHER PUBLICATIONS

International Search Report for Application No. PCT/US2014/060070; dated Jul. 17, 2015.
Written Opinion for Application No. PCT/US2014/060070; dated Jul. 17, 2015.

* cited by examiner

NON-LINEAR BUMPER BEARINGS

RELATED APPLICATIONS

This application claims the benefit of and priority to U.S. Provisional Patent Application No. 61/891,066 filed Oct. 15, 2013, the contents of which are incorporated herein by reference in their entirety.

BACKGROUND OF THE INVENTION

1. Field of the Invention

The present disclosure relates to bearings, and more particularly to bearing supports for applications such as rotors in gas turbine engines.

2. Description of Related Art

A variety of bearings are known for use in supporting rotating components. For example, in gas turbine engines, the spools are supported by bearings for rotation of rotor blades in the compressor and turbine. Over the wide range of operational speed of a gas turbine engine, or other systems with wide ranges of operational speed, it can be beneficial to include mechanical equivalent spring stiffness to the bearing supports to optimize the rotor critical speed system and also to include damping to the spring to reduce rotor radial excursion as it passes through these critical speeds. For example, during startup of a gas turbine engine, the shaft and bearings may pass through two or more critical rotor natural frequencies (called critical speeds). If one or more of these critical speeds presents in the operational speed range, it could damage the engine. Radial springs can be provided to tune these critical speeds outside of the operational speed range.

One drawback to conventional radial springs is that if the springs are too soft, they can contribute to hung-start. Hung-start results from asymmetric temperature distribution on both rotating and non-rotating components in a gas turbine engine. For example, in an auxiliary power unit (APU) with the air inlet door closed after shut-down, natural convection gives rise to thermal gradients between the top and bottom of the engine. The thermal gradients described above can bend the rotor against the soft springs. During warm restart, i.e., restarting the engine before the engine has completely cooled, the bent state of the rotor can cause an increase in rotor imbalance, potentially leading to failure to accelerate. Hung-start occurs when the level of rotor deflection exceeds a threshold causing impeller and turbine blades to rub against their shrouds together with heavy rub of seal teeth or bristles against their corresponding runner or land. Rotor-rubbing can drastically increase drag torque, and as a consequence the starter may not be able to provide sufficient energy to overcome aero-mechanical drags. In such a case, the rotor fails to accelerate and eventually must be shut down by the control system.

Such conventional methods and systems have generally been considered satisfactory for their intended purpose. However, there is still a need in the art for techniques to support rotors that allow for improved warm restart. The present disclosure provides solutions for these problems.

SUMMARY OF THE INVENTION

In an embodiment, a bumper bearing assembly includes a bearing housing having a level of radial spring stiffness, wherein the bearing housing defines a bearing seat. A bumper bearing is connected to the bearing housing by a spring having a level of radial spring stiffness lower than that of the bearing housing. The bumper bearing is configured to apply the level of radial spring stiffness of the spring against a rotor with the bumper bearing spaced apart from the bearing seat. The bearing housing is configured to apply the level of radial spring stiffness of the bearing housing against the rotor with the bumper bearing seated against the bearing seat.

The bumper bearing can include a coating on a bearing surface opposite the bearing seat, wherein the coating is configured to engage a rotor rotating relative to the bearing seat. The bumper bearing can include a plurality of circumferentially spaced bumper segments each connected to the bearing housing with a respective spring having a level of radial spring stiffness lower than that of the bearing housing. An anti-rotation lug can be disposed between each circumferentially adjacent pair of bumper segments, e.g., to limit circumferential rotation of the bumper segments.

A second bumper bearing opposed to the first bumper bearing can be connected to the bearing housing by a second spring having a level of radial spring stiffness lower than that of the bearing housing. The second bumper bearing is positioned to apply the level of radial spring stiffness of the second spring in a second radial direction, opposed to the radial direction of the first bumper bearing described above, against the rotor with the second bumper bearing spaced apart from the second bearing seat. The bearing housing is configured to apply the level of radial spring stiffness of the bearing housing against the rotor with the second bumper bearing seated against the second bearing seat.

It is contemplated that the first and second bearing seats can be spaced apart from one another axially relative to the longitudinal axis for counteracting thermally induced warpage in the rotor. The first and second bumper bearings can each have an arcuate inner surface for engaging the rotor. The arcuate inner surfaces can define a bearing radius, and a bumper span can be defined axially from the center of the first bumper bearing to the center of the second bumper bearing. The ratio of the bumper span to the bearing radius can be between 1 and 5.

Each of the first and second bumper bearings can be individually tuned so the first and second bumper bearings differ from one another in at least one of respective bearing axial length, respective level of radial spring stiffness of the bearing housing, respective level of radial spring stiffness of the spring, respective bumper bearing angular arc length, respective bumper bearing clearance to the rotor, and respective gap between the bumper bearing and the bearing seat.

A gas turbine engine includes a casing. A rotor is mounted for rotation about a longitudinal axis relative to the casing. A bumper bearing assembly, as described above, is mounted to the casing. The bumper segments described above can substantially surround the rotor. The rotor can include a set of rotary turbomachine blades positioned to rotate relative to a turbomachine shroud of the casing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
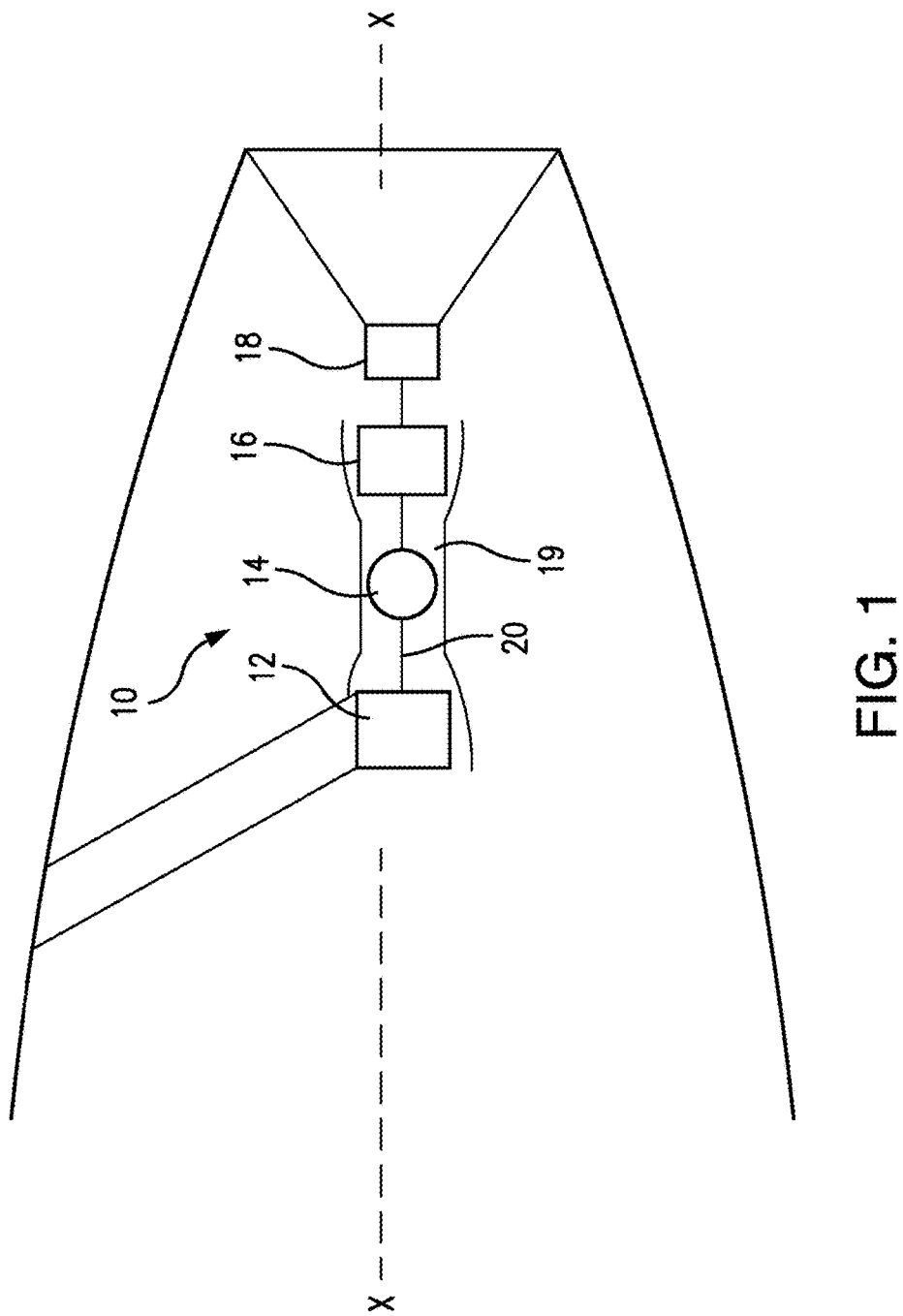
FIG. 1 is a schematic side elevation view of an exemplary embodiment of a gas turbine engine constructed in accordance with the present disclosure, showing basic engine components.

Reference will now be made to the drawings wherein like reference numerals identify similar structural features or aspects of the subject disclosure. For purposes of explanation and illustration, and not limitation, a partial view of an exemplary embodiment of a gas turbine engine in accordance with the disclosure is shown in FIG. 1 and is designated generally by reference character 10. The systems and methods described herein can be used to alleviate hung-start in warm restarting gas turbine engines, such as auxiliary power units.

FIG. 1 schematically illustrates an example of a gas turbine engine 10 including (in serial flow communication) a compressor 12, a combustor 14, and a turbine 16. The gas turbine engine 10 is circumferentially disposed about an engine centerline, longitudinal axis X. During operation, air is pulled into the gas turbine engine 10 and pressurized by the compressor 12 mixed with fuel, and the mixture is combusted in the combustor 14. Hot combustion gases generated within the combustor 14 flow through turbine 16, which extracts energy from the hot combustion gases, and then out of gas turbine engine 10 through exhaust system 18. Gas turbine engine 10 is shown in FIG. 1 in the exemplary context as an auxiliary power unit (APU) in the tail of an aircraft. Gas turbine engine 10 includes a casing 19, e.g., that is a fixed structure relative to the tail of the aircraft shown in FIG. 1. Rotor 20, shown schematically in FIG. 1 is described in greater detail below.

Figure 2:
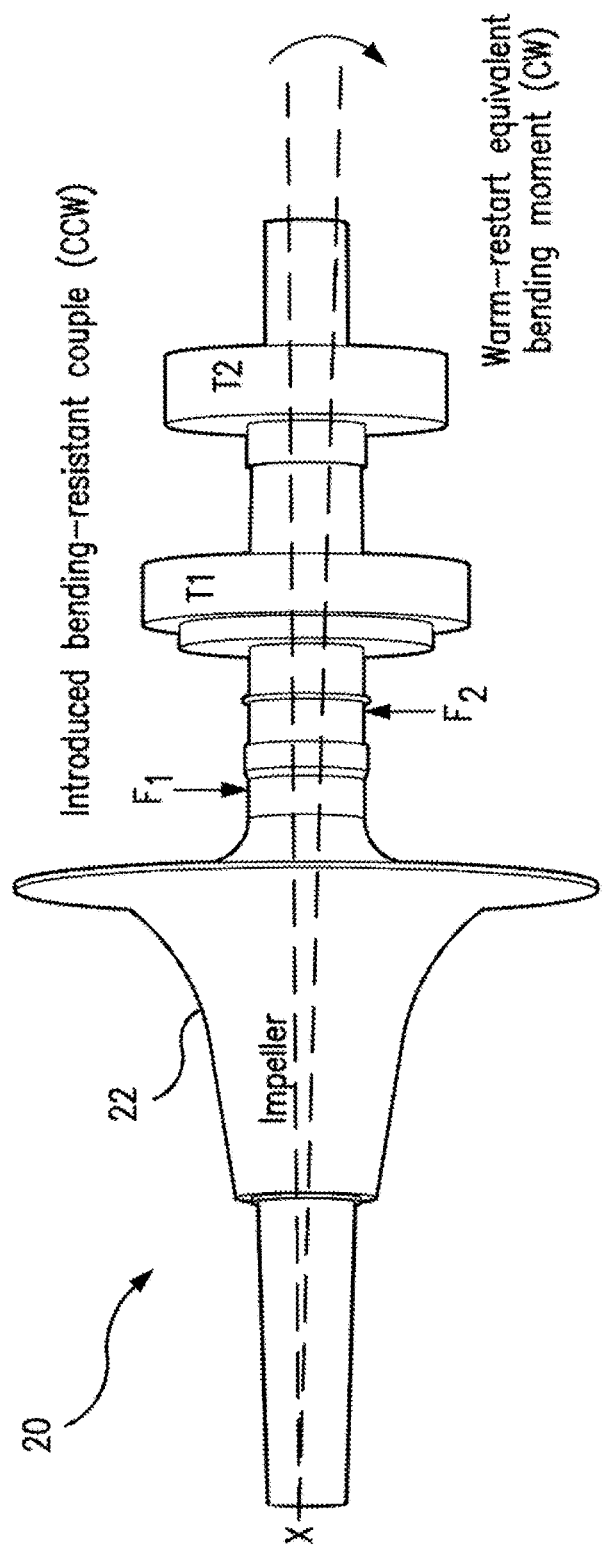
FIG. 2 is a schematic side view of the rotor of the gas turbine engine of FIG. 1, indicating the tendency for bending in the rotor that can occur during warm restart.
Figure 3:
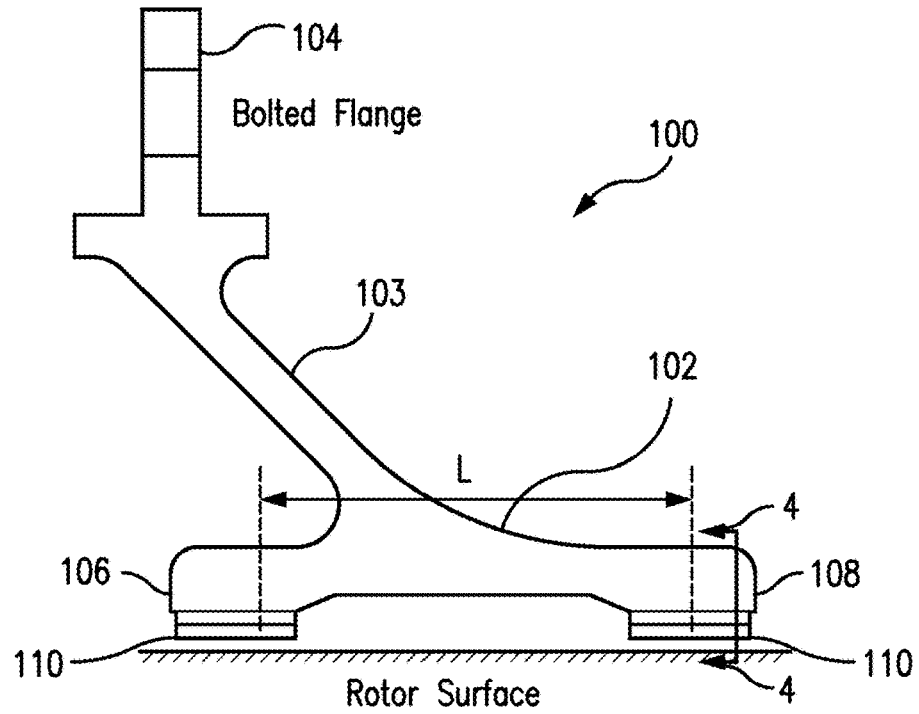
FIG. 3 is a cross-sectional side elevation view of the bumper bearing assembly of the gas turbine engine of FIG. 1, showing the axially spaced apart bumper bearings.

Referring now to FIG. 2, rotor 20 of gas turbine engine 10 is shown. Rotor 20 is mounted for relative rotation to the casing 19 of gas turbine engine 10. Rotor 20 includes an impeller portion 22 that forms a portion of compressor 12 described above. Rotor 20 also includes two turbine blade assemblies, labeled T1 and T2 in FIG. 2, i.e., including rotary turbomachine blades which rotate relative to a stationary turbomachine shroud. Turbine blade assemblies T1 and T2 are indicated schematically in FIG. 2. During conditions after shut down, there is a tendency for rotor 20 to bend along its length due to thermal gradients as described above. This tendency to bend is indicated schematically with the dashed lines in FIG. 2. The warm restart equivalent bending moment is shown in the clock-wise direction in FIG. 2. In an embodiment, this can be counteracted by an induced bending resistant coupling acting where forces F1 and F2 are indicated in FIG. 2, to induce a bending moment a counter clockwise direction. FIG. 3 shows bumper bearing assembly 100 for providing this induced bending resistant coupling.

With reference now to FIG. 3, bumper bearing assembly 100 includes a bearing housing 102 that defines a cone section 103 and has a flange 104 for bolting to a stationary support structure, e.g. to casing 19 which can be a diffuser casing, for example, of gas turbine engine 10. Bearing housing 102 has a level of radial spring stiffness, and defines a pair of longitudinally spaced apart bearing seats 106 and 108 along axis X of FIG. 1, e.g., bearing seat 106 is forward and bearing seat 108 is aft. Bumper bearings 110 are associated with bearing seats 106 and 108. The bumper bearings 110 are substantially identical in both longitudinal locations, with the forward bumper bearing 110 being positioned to apply force F1 of FIG. 2, and the aft bumper bearing 110 being positioned to apply the opposed force F2 of FIG. 2. It should be understood that bumper bearings 110 apply the opposed forces F1 and F2 along rotating directions as rotor 20 rotates.

Figure 6:
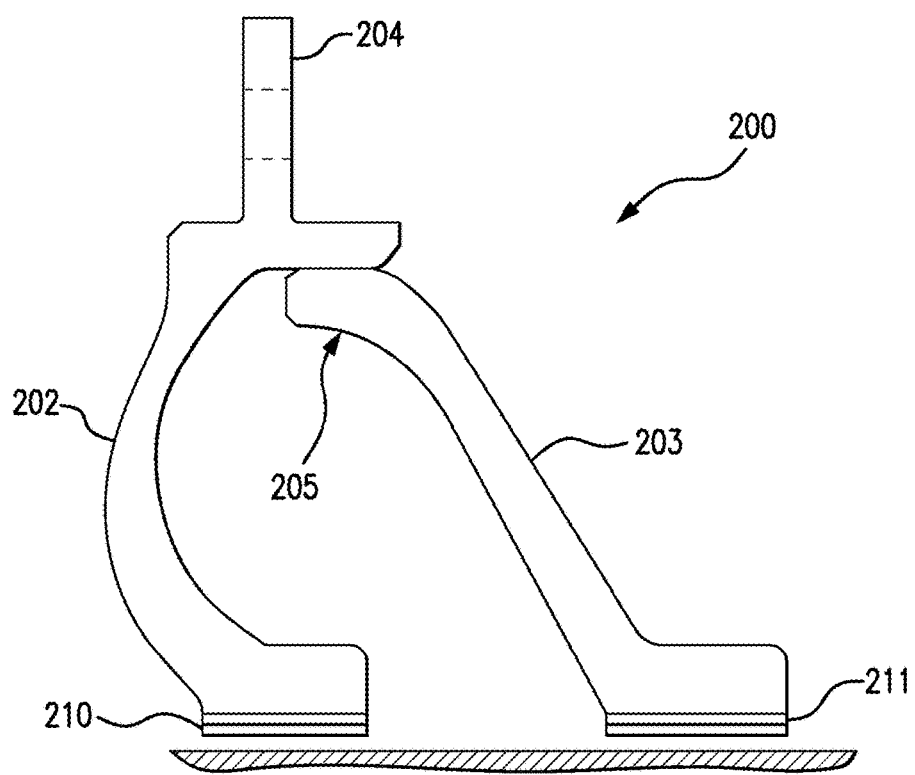
FIG. 6 is a cross-sectional side elevation view of another embodiment of a bumper bearing assembly, showing two separate bearing housings, each with a respective bumper bearing seated therein.

The forward and aft bumper bearings 110 can be integrated into one bearing housing 102, as shown in FIG. 3, with one single flange 104 bolted to a stationary support structure. In another embodiment, the two bumper bearings are not integrated into a single structure. Each bumper bearing can have its own bearing housing. These two individual bumper bearings can be assembled to the stationary support structure at the same location or at two different stationary support structures. For example the forward bumper bearing bolted flange can be connected in series with the aft bumper bearing housing for mounting both to the same stationary support structure. In another embodiment of a bearing assembly 200 shown in FIG. 6, one bumper bearing housing 203 is connected to the other bumper bearing housing 202, which has a bolted flange 204, by a mechanical joint 205 such as a press-fit or spline-coupling. Only one bolted flange 204 is connected to the stationary support structure. Each of the bumper bearings 210 and 211 has its own bearing housing, i.e., forward bumper bearing 210 is seated in bearing housing 202, and aft bumper bearing is seated in bearing housing 203.

Figure 4:
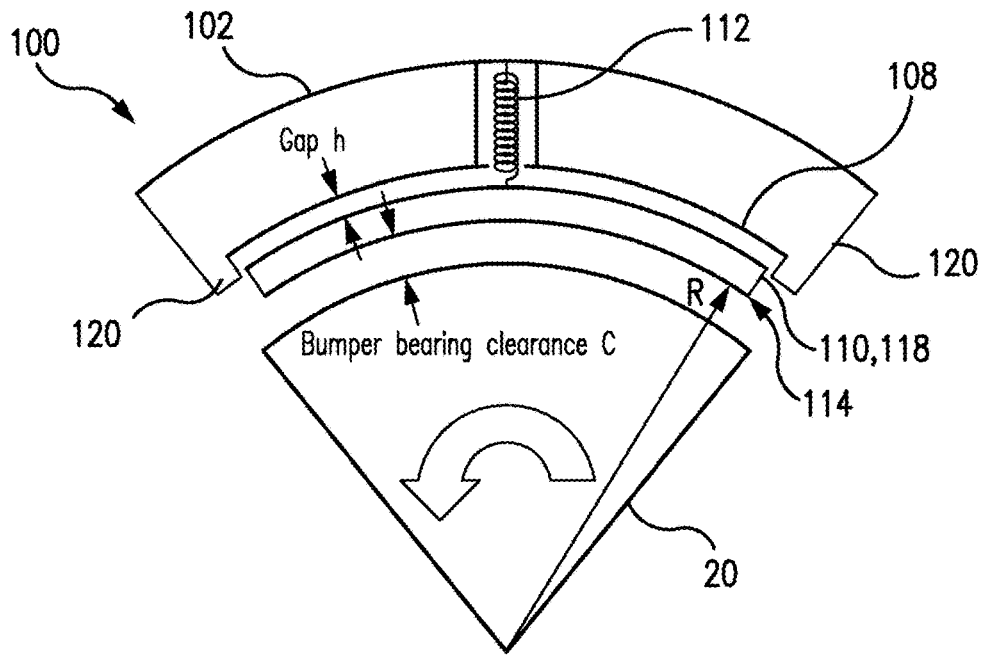
FIG. 4 is a schematic cross-sectional end elevation view of the bumper bearing assembly of FIG. 3, showing the cross-section 4-4 indicated in FIG. 3.

With reference now to FIG. 4, the aft bumper bearing 110 is shown in greater detail, and it is to be understood that the forward bumper bearing 110 is similarly configured. Bumper bearing 110 is connected to the bearing housing 102 by a spring 112 having a level of radial spring stiffness, i.e., a first level of spring stiffness, that is lower than that of the bearing housing 102, i.e., the second level of spring stiffness. Bumper bearing 110 applies the first level of radial spring stiffness against rotor 20 with the bumper bearing 110 spaced apart from the bearing seat 108. Bearing housing 102 itself applies the second level of radial spring stiffness against rotor 20 only after the bumper bearing 110 is seated against the bearing seat 108, i.e., when spring 112 has bottomed out.

A gap h exists between bumper bearing 110 and bearing seat 108 when no force is being applied against the bias of spring 112. The rotation of rotor 20 is indicated schematically with the large arrow in FIG. 4. Bumper bearing 110 includes a coating 114 on the arcuate bearing surface opposite the bearing seat 108, i.e., the surface that contacts rotor 20 when the bumper bearing clearance C to the rotor 20 is closed. Coating 114 is configured to engage rotor 20 when rotor 20 is rotating relative to bearing seat 108. Coating 114 is therefore of a relatively a low-friction, soft material compared with the base material in bumper bearing 110. Anti-rotation lugs 120 limit circumferential travel of bumper bearing 110 relative to bearing seat 108.

Figure 5:
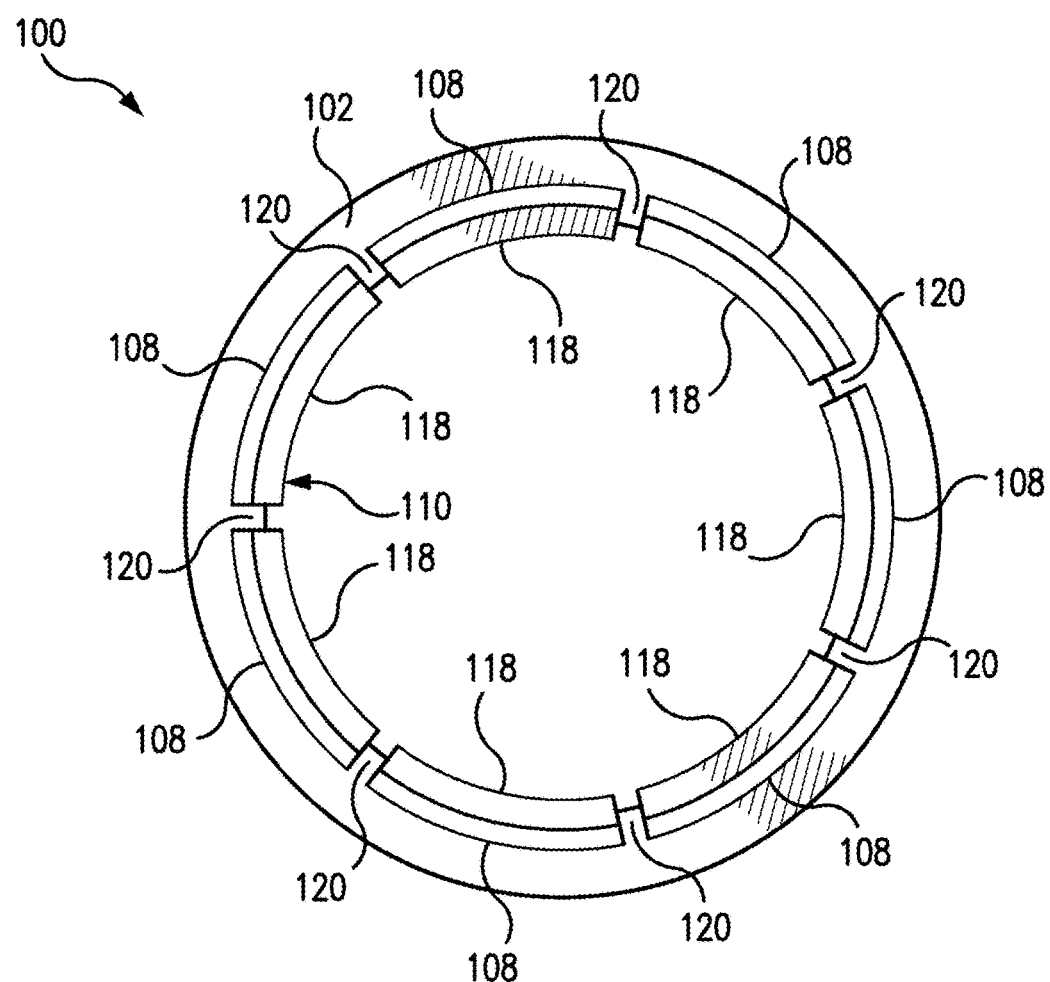
FIG. 5 is a schematic cross-sectional end elevation view of the bumper bearing assembly of FIG. 3, schematically showing the cross-section 4-4 indicated in FIG. 3 for the entire circumference of the assembly.

With reference now to FIG. 5, the bumper bearing 110 is broken into a plurality of circumferentially spaced bumper segments 118 that substantially surround rotor 20, which is not shown in FIG. 5 for purposes of clarity. The portion of bearing housing 102 shown in FIG. 5 forms a ring, and can be made of metal or any other suitable material. While not depicted for sake of clarity, each bumper segment 118 is connected to bearing housing 102 with a respective spring, e.g. spring 112 of FIG. 4, having a level of radial spring stiffness lower than that of the bearing housing 102. An anti-rotation lug 120 is disposed between each circumferentially adjacent pair of bumper segments 118, e.g., to limit circumferential rotation of each bumper segment 118. As shown in FIG. 4, suitable spacing should be provided between each anti-rotation lug 120 and the corresponding faces of the bumper segments 118 to allow the bumper segments 118 to move radially relative to their respective bearing seats, while still limiting circumferential movement of the bumper segments 118.

Referring again to FIG. 3, the forward and aft bearing seats 106 and 108, and the corresponding bumper bearings 110, are spaced apart from one another axially relative to the longitudinal axis X for counteracting thermally induced warpage in the rotor. This spacing allows the two bumper bearings 110 to apply the forces F1 and F2 described above for counteracting warpage along rotor 20. The arcuate inner surfaces of bumper bearings 110 define a bearing radius R, shown in FIG. 4. A bumper span L, shown in FIG. 3, is defined axially from the center of the forward bumper bearing 110 to a center of the aft bumper bearing 110. The ratio of the bumper span L to the bearing radius R, L/R, can be tuned for specific applications. As an example, it is contemplated that the ratio L/R can be between 1 and 5.

The first level of radial bumper or spring stiffness is relatively soft and it corresponds to the normal engine operating conditions, e.g., operation other than warm restart. The second level of radial stiffness is derived from the flexibility of bearing housing 102, and is of a higher or stiffer value than the first level. The second level of radial stiffness is activated when the rotor 20 is subjected to adverse conditions in which the rotor 20 is undergoes excessive rotor excursion. In the second level of radial stiffness, the spring 112 and bearing housing 102 form a parallel spring system in which the overall stiffness is the sum of the two individual spring stiffnesses, i.e., the conceptually the spring 112 and bearing housing 102 considered as a spring can both be connected to a common ground so they act in parallel when bumper bearing 110 bottoms out on bearing seat 108. The higher value of the dual bumper bearing radial stiffness generates a bending couple, shown schematically in FIG. 2 which opposes the induced thermal-misalignment caused by warm restart. Thus, the level of warm restart thermal-misalignment transmitted to the front bearing mounting rotor 20 to casing 19 is reduced. When unfavorable operating conditions cease, casing 19 and rotor 20 reach thermal equilibrium, and the bumper bearing radial stiffness returns to its first soft stiffness level. The two levels of spring stiffness thus provide a non-linear spring stiffness. The soft spring stiffness protects bumper bearings 110 from wear under normal rotor excursion as rotor 20 passes through critical speeds.

Referring again to FIG. 4, the dimension of gap h, can be a function of impeller shroud clearance and turbine tip shroud clearance. Its value can be selected to ensure that when h is equal to zero, the minimum blade-shroud clearance is positive (clearance >0). As the engine steady state thermal condition is re-established, the warm-restart thermal misalignment ceases. The gap h becomes positive and the second spring level of radial spring stiffness is disengaged.

While described above as being similar, it is contemplated that the forward and aft bumper bearings 110 shown in FIG. 3 can be individually tuned for particular applications with design characteristics that differ from one another including bearing axial length, first level spring stiffness, second level spring stiffness, bearing angular arc length for individual segments 118, bumper bearing clearance C (shown in FIG. 4), and non-linear gap h. The bending-resistant couple can be defined for different applications through these parameters. It is also contemplated that other components, such as brush air seals, can be inserted within the space separating the two bumper bearings 110.

The methods and systems of the present disclosure, as described above and shown in the drawings, provide for gas turbine engines with superior properties including alleviation of hung-start in warm restart. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A bumper bearing assembly comprising:
   a bearing housing having a level of radial spring stiffness, wherein the bearing housing defines a first bearing seat and a second bearing seat; and
   a bumper bearing connected to the bearing housing by a spring having a level of radial spring stiffness lower than that of the bearing housing, wherein the bumper bearing is configured to apply the level of radial spring stiffness of the spring against a rotor with the bumper bearing spaced apart from the first bearing seat, and wherein the bearing housing is configured to apply the level of radial spring stiffness of the bearing housing against the rotor with the bumper bearing seated against the first bearing seat; and
   a second bumper bearing opposed to the bumper bearing and connected to the bearing housing by a second spring having a level of radial spring stiffness lower than that of the bearing housing, wherein the second bumper bearing is positioned to apply the level of radial spring stiffness of the second spring in a second radial direction opposed to the first radial direction against the rotor with the second bumper bearing spaced apart from the second bearing seat, and wherein the bearing housing is configured to apply the level of radial spring stiffness of the bearing housing against the rotor with the second bumper bearing seated against the second bearing seat, wherein each of the first and second bumper bearings is individually tuned so the first and second bumper bearings differ from one another in respective level of radial spring stiffness of the bearing housing.

2. The bumper bearing assembly as recited in claim 1, wherein the bumper bearing and bearing seat are arcuate.

3. The bumper bearing assembly as recited in claim 1, wherein the bumper bearing includes a coating on a bearing surface opposite the bearing seat, wherein the coating is configured to engage the rotor rotating relative to the bearing seat.

4. The bumper bearing assembly as recited in claim 1, further comprising an anti-rotation lug at one end of the bearing seat and engaged to limit circumferential rotation of the bumper bearing.

5. The bumper bearing assembly as recited in claim 1, wherein the bumper bearing includes a plurality of circumferentially spaced bumper segments each connected to the bearing housing with a respective spring including the a level of radial spring stiffness lower than that of the bearing housing.

6. The bumper bearing assembly as recited in claim 5, wherein an anti-rotation lug is disposed between each circumferentially adjacent pair of bumper segments.

7. The bumper bearing assembly as recited in claim 5, wherein the bumper segments substantially surround a rotor passage through the bearing housing.

8. A gas turbine engine comprising:
a casing;
a rotor mounted for rotation about a longitudinal axis relative to the casing; and
a bumper bearing assembly mounted to the casing, the bumper bearing assembly including:
a bearing housing having a level of radial spring stiffness, wherein the bearing housing defines first and second bearing seats;
a first bumper bearing connected to the bearing housing by a first spring having a level of radial spring stiffness lower than that of the bearing housing, wherein the first bumper bearing is positioned to apply the level of radial spring stiffness of the first spring in a first radial direction against the rotor with the first bumper bearing spaced apart from the first bearing seat, and wherein the bearing housing is configured to apply the level of radial spring stiffness of the bearing housing against the rotor with the first bumper bearing seated against the first bearing seat; and
a second bumper bearing opposed to the first bumper bearing and connected to the bearing housing by a second spring having a level of radial spring stiffness lower than that of the bearing housing, wherein the second bumper bearing is positioned to apply the level of radial spring stiffness of the second spring in a second radial direction opposed to the first radial direction against the rotor with the second bumper bearing spaced apart from the second bearing seat, and wherein the bearing housing is configured to apply the level of radial spring stiffness of the bearing housing against the rotor with the second bumper bearing seated against the second bearing seat, wherein each of the first and second bumper bearings is individually tuned so the first and second bumper bearings differ from one another in respective level of radial spring stiffness of the bearing housing.

9. The gas turbine engine as recited in claim 8, wherein the first and second bearing seats are spaced apart from one another axially relative to the longitudinal axis for counteracting thermally induced warpage in the rotor.

10. The gas turbine engine as recited in claim 9, wherein the first and second bumper bearings each have an arcuate inner surface for engaging the rotor, wherein the arcuate inner surfaces define a bearing radius, and wherein a bumper span is defined axially from a center of the first bumper bearing to a center of the second bumper bearing, and wherein the ratio of the bumper span to the bearing radius is between 1 and 5.

11. The gas turbine engine as recited in claim 8, wherein the first and second bumper bearings each include a coating on a bearing surface configured to engage the rotor for rotation of the rotor relative to the first and second bearing seats.

12. The gas turbine engine as recited in claim 8, further comprising a respective anti-rotation lug at one end of each bearing seat and engaged to limit circumferential rotation of a respective one of the first and second bumper bearings.

13. The gas turbine engine as recited in claim 8, wherein each of the first and second bumper bearings includes a plurality of circumferentially spaced bumper segments each connected to the bearing housing with a respective spring.

14. The gas turbine engine as recited in claim 13, wherein an anti-rotation lug is disposed between each circumferentially adjacent pair of bumper segments.

15. The gas turbine engine as recited in claim 13, wherein the bumper segments substantially surround the rotor.

16. A bumper bearing assembly comprising:
a bearing housing having a level of radial spring stiffness, wherein the bearing housing defines first and second bearing seats;
a first bumper bearing connected to the bearing housing by a first spring having a level of radial spring stiffness lower than that of the bearing housing, wherein the first bumper bearing is positioned to apply the level of radial spring stiffness of the first spring in a first radial direction against a rotor with the first bumper bearing spaced apart from the first bearing seat, and wherein the bearing housing is configured to apply the level of radial spring stiffness of the bearing housing against the rotor with the first bumper bearing seated against the first bearing seat; and
a second bumper bearing opposed to the first bumper bearing and connected to the bearing housing by a second spring having a level of radial spring stiffness lower than that of the bearing housing, wherein the second bumper bearing is positioned to apply the level of radial spring stiffness of the second spring in a second radial direction opposed to the first radial direction against the rotor with the second bumper bearing spaced apart from the second bearing seat, and wherein the bearing housing is configured to apply the level of radial spring stiffness of the bearing housing against the rotor with the second bumper bearing seated against the second bearing seat, wherein each of the first and second bumper bearings is individually tuned so the first and second bumper bearings differ from one another in respective level of radial spring stiffness of the bearing housing.

17. The bumper bearing assembly as recited in claim 16, wherein the first and second bearing seats are spaced apart from one another axially relative to the longitudinal axis for counteracting thermally induced warpage in the rotor.

18. The bumper bearing assembly as recited in claim 17, wherein the first and second bumper bearings each have an arcuate inner surface for engaging the rotor, wherein the arcuate inner surfaces define a bearing radius, and wherein a bumper span is defined axially from a center of the first bumper bearing to a center of the second bumper bearing, and wherein the ratio of the bumper span to the bearing radius is between 1 and 5.

19. The bumper bearing as recited in claim 16, wherein each of the first and second bumper bearings includes a plurality of circumferentially spaced bumper segments each connected to the bearing housing with a respective spring.

20. The bumper bearing as recited in claim 16, wherein each of the first and second bumper bearings is individually tuned so the first and second bumper bearings differ from one another in at least one of respective bearing axial length, respective level of radial spring stiffness of the spring, respective bumper bearing angular arc length, respective bumper bearing clearance to the rotor, and respective gap between the bumper bearing and the bearing seat.

* * * * *